Feb. 15, 1938.  J. H. L'ABEE-LUND  2,108,263
COMPASS
Filed Sept. 3, 1935
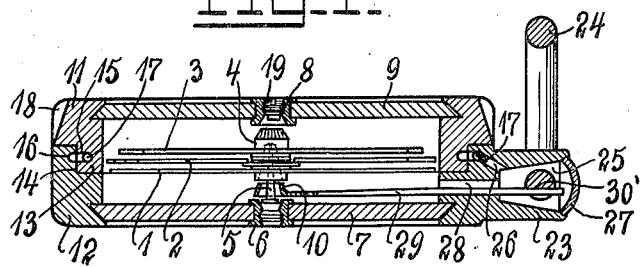
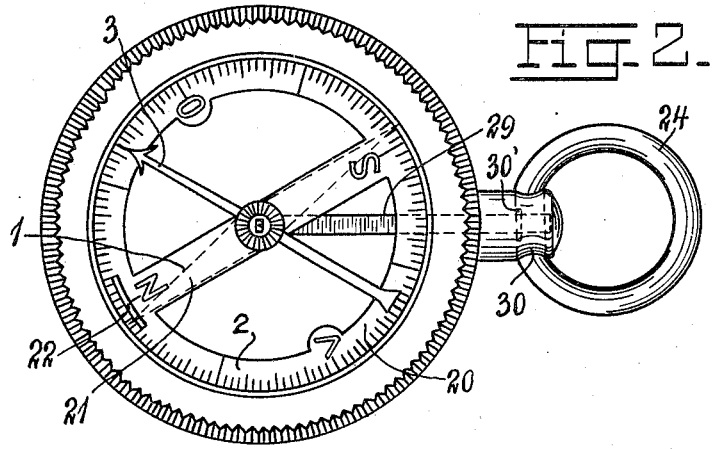
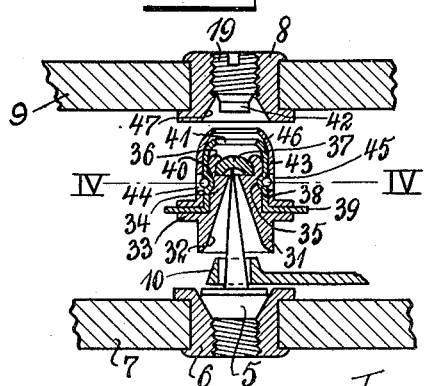 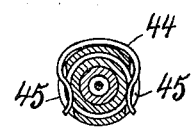
Inventor
Johan Henrik L'Abee Lund
By
E. F. Wenderoth
Atty Patented Feb. 15, 1938

2,108,263

UNITED STATES PATENT OFFICE 2,108,263

COMPASS

Johan Henrik L'Abée-Lund, Slemdal, near Oslo, Norway, assignor to L'Abée Lund Aktieselskab, Oslo, Norway Application September 3, 1935, Serial No. 39,077 In Norway May 8, 1934

8 Claims. (Cl. 33—224)

The invention relates to a compass of the kind having a march direction pointer and a North-South pointer, a compass-card or a declination needle, the said pointers being both in such manner connected with the compass needle that they can be adjusted in the desired angular position relatively to the latter and so that they having been adjusted, keep their position relatively to the compass needle, independently of the orienting of the compass casing or holder. The North-South pointer serves to indicate the geographical North-South direction and is therefore adjusted relatively to the compass needle in such way that it forms an angle to the latter corresponding to the variation. In compasses of known construction of this kind an adjusting device accessible from the outside has been arranged, by means of which the march directing pointer may be adjusted from the outside when the compass needle is being arrested, while the adjustment of the North-South pointer is effected during the manufacture of the compass. When a compass is to be used in countries having different magnetic variation, it will however be necessary to adjust the North-South pointer in order that the latter shall be able to fill its purpose. Such adjustment is not however possible in compasses of the above named kind in constructions hitherto known, or the adjustment is in any case very difficult to perform.

The present invention has for its main purpose to do away with this difficulty by arranging two adjusting devices which are independent of each other and both of which are accessible from the outside, so that the march directing pointer and the North-South pointer can be adjusted from the outside.

From the reason that the march directing pointer will have to be adjusted very often, while the North-South pointer usually may remain in unaltered position for a longer time, the adjusting device for the North-South pointer is according to the invention preferably so arranged, that it under normal conditions is not in engagement with the North-South pointer.

Further details and advantages of the construction of this compass will be explained in the description in reference to the drawing, which shows a preferred form of carrying out a compass in accordance with the invention.

Fig. 1 shows an axial sectional view of the compass,

Fig. 2 shows the compass in plan,

Fig. 3 is an axial section on larger scale, showing the arrangement of the adjusting device for the compass needle, the compass-card and the indicating needle.

Fig. 4 is a section on the line IV—IV, Fig. 3.

In the drawing, 1 indicates the compass needle, 2 the compass card, 3 the indicating needle. These three parts are fastened to a bearing part 4, which rests on the compass pivot. The bearing part 4 is composed of several minor parts and will be described in the following with reference to Fig. 3. The compass pivot 5 is screwed into the box 6, which is placed in a central hole in the compass bottom 7.

This bottom plate is preferably made of glass or some other transparent material. A corresponding box 8 is arranged in the glass cover 9 and will be described later on. By means of the arresting cone 10, the bearing part 4 can be pressed upwards against the box 8.

The compass case consists of an upper ring 11 and of a lower ring 12, preferably made of the material known under the registered trade-mark "Bakelite" or of similar material. The ring 11 has a flange, which fits into a corresponding groove in the lower ring 12. The two rings 11 and 12 are free to revolve, but are prevented from vertical displacement by means of the parts 15, 16, 17, in itself a well known arrangement. It consists in a peripherical groove 15 on the outside of flange 13 and a corresponding peripherical groove on the inside of flange 14. The grooves 15 and 16 together constitute a ring-shaped channel. In this channel a wire can be put in, which will take the form of horizontal waves through the whole length of the channel and will prevent any axial displacement. The upper ring has rifled edge, thus enabling an easy turning in relation to the lower part of the compass. The box 8 is unmovably fixed to the glass 9 which again is fitted in and fixed to the ring 11. A turning of the ring will involve a turning of the box 8 and therewith also of the bearing part 4, as soon as the latter by means of the arresting cone is pressed upwards. In this position, the compass needle 1 will be arrested, but the indicating needle 3 which is connected with the upper part of the bearing 4 will follow the ring 11.

To box 8 is fastened an adjusting screw 19 and by means of this screw the compass-card can be adjusted in relation to the compass needle to an extent corresponding to the prevailing magnetic variation.

As shown in Fig. 2, the compass-card 2, is ring-shaped fitted out with a compass-scale and a cross-bar 21 following the North-South line. This cross-bar is usually so broad that it entirely covers the compass needle. In order to enable adjustment of the compass-card in relation to the compass needle, the former has a slot 22, through which the point of the compass needle is visible.

The lower ring 12 has on one side a protruding part 23, to which is fastened a ring, by which the compass can be hung up, when carried. The ring at the same time serves the purpose for manipulating the arresting device. The protruding part 23 has a cavity 25, from which is drilled a hole 26 to the groove 16 in the ring 12. The hole 26 serves for putting in place the wire 17. The cavity is covered by a plate 27, which prevents the wire from being extracted after the compass has been put together and finished. From the cavity leads furthermore an opening 28 into the compass space, which opening allows the arresting-bar 29 to pass into the centre of the compass. As already mentioned, the ring 24 serves for manipulating the arresting-device. For this purpose the cylindrical part of the ring 30 is made flat on the inner side of the cylinder at point 30'. By turning the ring from its position as shown in Fig. 1 to the position as shown in Fig. 2, the end of the bar 29 will be pressed down. At the same time the arresting-cone 10 will be lifted and thus press the bearing part 4 up against the box 8.

The arrangement of the compass needle, the compass-card and the indicating needle is in the following described with reference to Figs. 3 and 4. The compass needle is in well known manner fastened to the centre-piece 31, which lower part is shaped as a hollow cone 32, corresponding to the arresting-cone 10.

The hollow-cone has a horizontal flange 33, supporting the compass needle. Above this flange, the centre-piece 31 has a cylindrical shape, and in this part there is a peripherical groove 35. On the top is an axial cavity, in which the compass-stone 37 is placed. The compass-card 2 is fastened to a case-shaped bearing 38, which with its horizontal flange 39 rests on flange 33 of the centrepiece. The bearing 38 encircles the cylindrical part 34 of the centrepiece and at 40 is pressed into the peripherical groove 35. By those means a comparatively firm connection between part 38 and the compass-centrepiece is obtained. The upper part of the bearing 38 has a diametrically disposed slot 41, corresponding to the lower edge of the adjusting screw 19.

The indicating needle 3 is fastened to the case-shaped bearing 43 which encircles bearing 38 and is secured to the same by means of a spring 44, as shown in Fig. 4. The spring is shaped as shown in Fig. 4. Its two bent ends are passed through corresponding slots in the bearing 43. This bearing has a conical upper part 46, corresponding to the hollow cone 47 in box 8.

To adjust the indicating needle in relation to the compass needle, the compass will first be clamped. The arresting cone 10 is moved upwards until brought in contact with the hollow cone 32, in the centrepiece 31 and thus arresting the compass needle in relation to the lower part of the compass.

At the same time, the cone 46 is brought in contact with the hollow cone 47, after which the indicating needle can be brought in the desired direction by turning the ring 11.

The adjustment of the compass card 2 relatively to the compass needle on account of the magnetic variation is performed by means of the screw 19. The latter is under normal conditions in such position, that the projection 42 does not engage the element 38 when the compass needle is being arrested. In order to adjust the compass card the adjustment screw 19 therefore has to be screwed so far down that the projection 42 at the arresting of the compass needle enters the slot 41 in the member 38. When the screw 19 is further turned the member 38 and the compass card connected therewith may be adjusted relatively to the compass needle, the latter being prevented from rotation by means of the arresting cone 10.

I claim:

1. A compass comprising a case, a compass magnet rotatably mounted in said case, means operable from outside the compass and capable of being coupled with said magnet, a pointer for indicating the march direction rotatably mounted in said case and adjustably connected to said magnet, means operable from outside the compass and capable of being coupled with said pointer, a member for compensating the magnetic variation rotatably mounted in said case and adjustably connected to the compass magnet and to said pointer, and means operable from outside the compass and capable of being coupled with said member, whereby said pointer and said member are adjustable from outside the compass in relation to each other and to said compass magnet.

2. A compass comprising a case, a compass magnet rotatably mounted in said case, a pointer for indicating the march direction rotatably mounted in said case and adjustably connected to the said magnet, means for arresting the said magnet, means operable from outside the compass case and capable of transferring movement into the case for setting the said pointer in a desired position relatively to the said magnet, a member for indicating the true North-South direction rotatably mounted in said case and adjustably connected to the compass magnet, and means operable from outside the compass case and capable of transferring movement into the case for setting the said member in a desired position relatively to the compass magnet, the said magnet, pointer and member rotating as a unit when the magnet is released.

3. A compass comprising a case, a pivot projecting from the bottom plate of the said case, a bearing part rotatably mounted on said pivot, a compass needle fixed to the said bearing part, means for engaging the bearing part, thereby securing the compass needle against rotation, a pointer for indicating the march direction adjustably connected to the said bearing part, means operable from outside the compass case and capable of transferring movement into the case for rotating the said pointer relatively to the compass needle, a member for indicating the true North-South direction and adjustably connected to the said bearing part, and means operable from outside the compass case and capable of transferring movement into the case for rotating the said means relatively to the compass needle from outside the compass, whereby the compass needle, the said pointer and the said member rotate as a unit when the compass needle is released.

4. A compass comprising a circular bottom plate, an annular wall part fixed to the said plate at its periphery, a second annular wall part rotatably connected to the first-named wall part, said wall parts being held from axial displacements relatively to each other, a glass cover fixed to the second wall part to complete a casing and provided with a central hole, a box fixed in the said hole and provided with a central bore, a threaded pin in the said bore, a pivot projecting upwardly from the said bottom plate in alignment with said bore, a bearing part comprising a bearing jewel resting upon said pivot and a centerpiece carrying said jewel and having a protruding cylindrical part, a compass needle fixed to the center piece, means for lifting the centerpiece from the pivot, thereby arresting the compass needle, a bearing element, rotatably mounted on the cylindrical part of the said centerpiece, a member adapted for indicating the true North-South direction fixed to the said bearing element, a second bearing element rotatably mounted on and enclosing the first said bearing element, and a pointer adapted to indicate the march direction fixed to the said second bearing element, said pointer being movable over said member, the second bearing element being adapted to engage with the said box when the compass needle is lifted, the pin in the said box being adapted to engage with the first-named bearing element when the compass needle is lifted, said pin being displaceable in a vertical direction in such manner that it can be moved out of engagement with the said bearing element when the march pointer is to be adjusted.

5. A compass as claimed in claim 4, wherein the lower wall part is provided with an upwardly projecting flange and the upper wall part is provided with a downwardly projecting flange, the outer diameter of one of said flanges being equal to the inner diameter of the other flange, said flanges being placed one enclosing the other, and further comprising a wire for connecting the two wall parts to each other, the said flanges each being provided with a peripheral groove, the two grooves forming in connection an annular cavity in which the said wire is inserted.

6. A compass as claimed in claim 2, in which the member adapted to indicate true North-South direction comprises a flat circular rim part and a diametral cross bar the width of which is so dimensioned that under normal conditions it covers the compass needle.

7. A compass as claimed in claim 4, wherein the centerpiece in its upwardly projecting part is provided with a peripheral groove into which a correspondingly-shaped part of the first-named bearing element is pressed.

8. A compass as claimed in claim 4, wherein the centerpiece in its upwardly projecting part is provided with a peripheral groove into which a correspondingly-shaped part of the first-named bearing element is pressed, and also comprising a spring U-shaped device by means of which the second bearing element is prevented from axial movement relatively to the centerpiece, said bearing element being provided with peripheral slots through which the arms of the spring device can engage with the grooved part of the first-named bearing element.

JOHAN HENRIK L'ABÉE-LUND.